Aug. 16, 1927.
G. E. JOHANSON
MOTOR VEHICLE
Filed Sept. 17, 1925
1,638,854
2 Sheets-Sheet 1
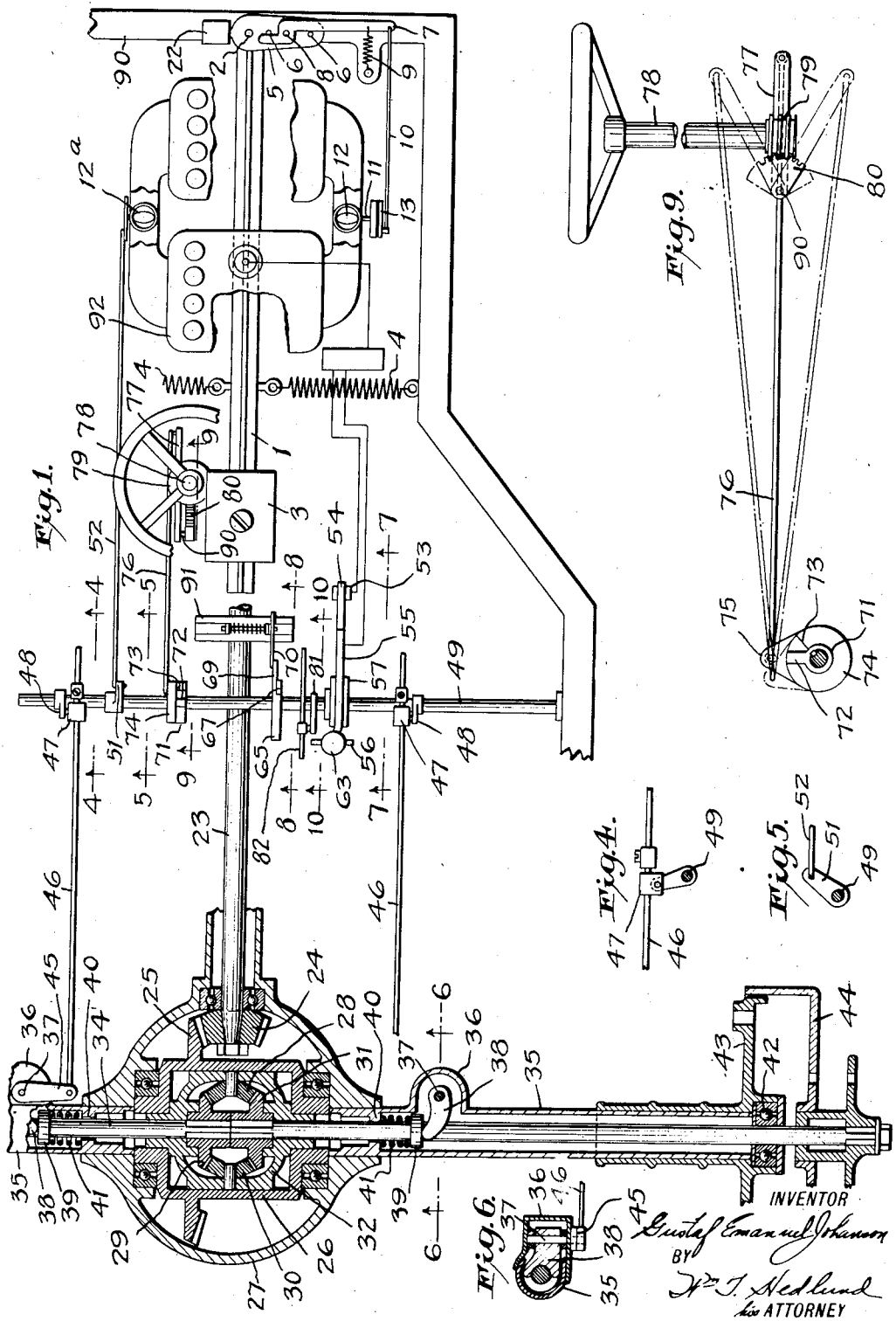

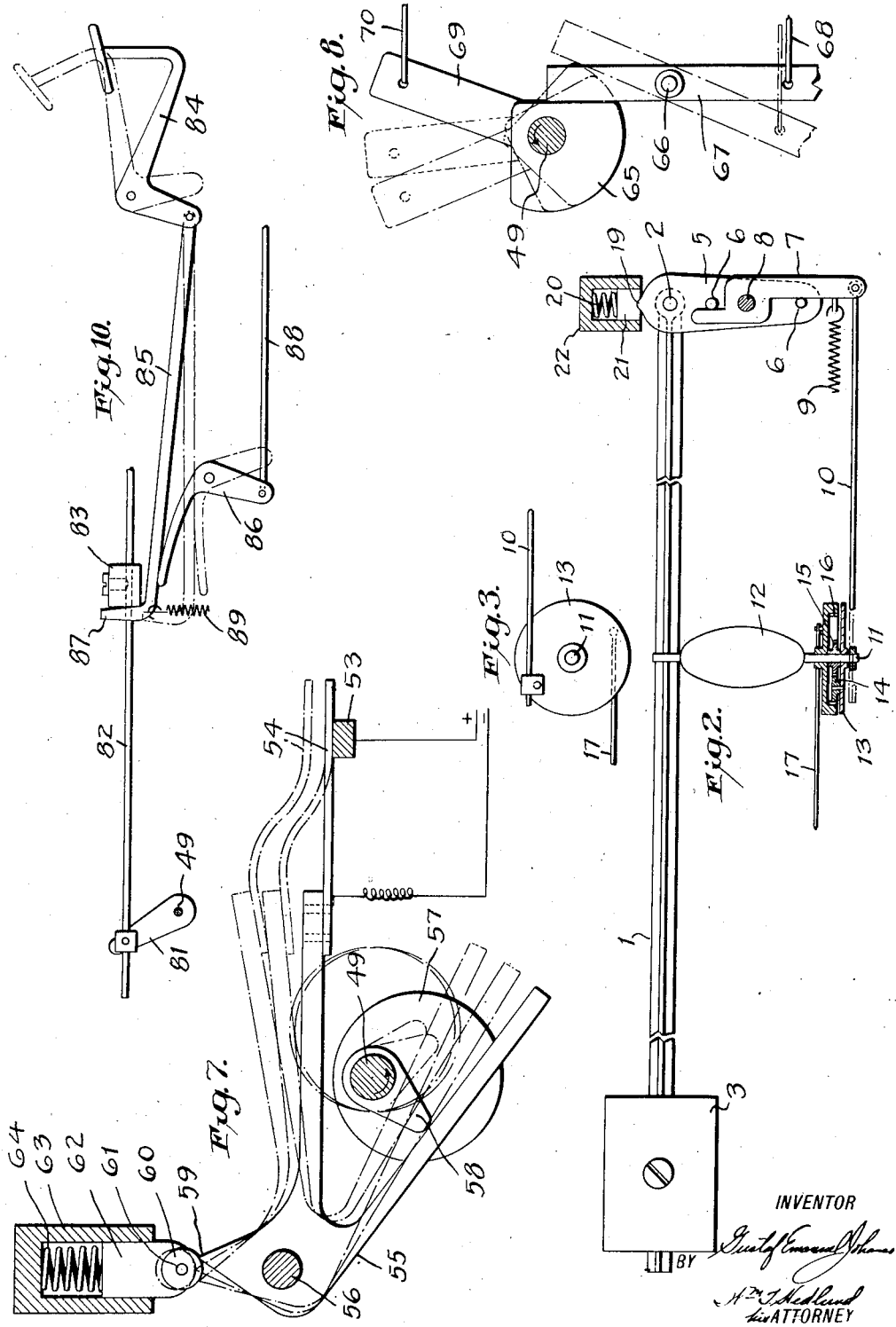

Patented Aug. 16, 1927.

1,638,854

UNITED STATES PATENT OFFICE.

GUSTAF EMANUEL JOHANSON, OF SUNDSVALL, SWEDEN.

MOTOR VEHICLE.

Application filed September 17, 1925, Serial No. 56,907, and in Sweden January 2, 1923.

The present invention relates to motor vehicles and has for its object to prevent the speed of a motor vehicle when changing its course, as when rounding a curve, from rising to a value at which the vehicle will skid or turn over. The invention comprises a safety arrangement which keeps the speed of the vehicle under this limit.

In general, the invention consists in a member situated on the vehicle or a member of the vehicle properly constructed and arranged so that upon rounding a curve, centrifugal action will affect the member, and means responsive to movement of the member to control the speed of the vehicle as by decreasing the fuel supply to the motor, or breaking the ignition, disengaging the motor from the driving mechanism or applying brakes.

The whole nature, the objects and the advantages of the invention will be apparent from the following description of some forms of my invention illustrated on the accompanying drawings in which: Fig. 1 shows an automobile chassis with several forms of my invention thereon; Fig. 2 is one form of the mechanism for controlling the fuel supply shown in Fig. 1 on enlarged scale; Fig. 3 is a side view of part of the throttle control means shown in Fig. 2; Fig. 4 is a view on line 4—4, Fig. 1; Fig. 5 is a view on line 5—5, Fig. 1; Fig. 6 is a view on line 6—6, Fig. 1; Fig. 7 is a view on line 7—7, Fig. 1; Fig. 8 is a view on line 8—8, Fig. 1; Fig. 9 is a view on line 9—9, Fig. 1; and Fig. 10 is a view on line 10—10, Fig. 1.

With reference to the first form of my invention shown in Figs. 1, 2 and 3, an arm 1 is mounted in horizontal position on the chassis and pivoted on a vertical shaft 2 which may be fixed to the motor or other member such as frame bar 90. On the free end of arm 1 is a weight 3 which is preferably adjustable along the arm. The arm is acted upon by two springs 4, each of which is attached at one end to the chassis. These springs tend to hold the arm in its middle neutral position.

A second arm 5 is fixed so as to be movable upon movement of arm 1 in proportional degree and has two pins or bosses 6 on the same, each of which bear against an arm of a two-armed lever 7 rotatable about a fixed shaft 8. If arm 5 swings in one direction or the other, the lever 7 is turned by means of pins 6 in direction against the force of spring 9. Lever 7 is connected by means of a rod 10 with a plate 13 fixed to a shaft 11 controlling the throttle 12, which controls the supply of fuel to motor 92.

Plate 13 carries a pinion 14 which meshes both with a gear 15 fixed to shaft 11 and an annular gear on the inner side of a rim on a plate 16 which is mounted so as to be rotatable relative to shaft 11 and which is connected by means of a rod 17 with the gas pedal and the usual throttle arm on the steering mechanism.

When the gas pedal is depressed or the throttle arm moved out of zero position, geared plate 16 is rotated so that a mechanism controlling supply of fuel to the engine such as throtle 12 is operated to increase the supply of fuel to the engine. Movement of lever 7 by arm 5 causes, however, a reverse operation of throttle 12 so that fuel supply to the motor is diminished.

Arm 5 is provided at one end with a projection 19 which takes hold in a corresponding depression in a piston 21, acted on by springs 20, in cylinder 21. The purpose of this arrangement is to prevent the arm 1 from attaining movement due to irregularities in the road.

The above described arrangement operates in the following manner:

On rounding a curve, the arm 1 swings, provided the centrifugal force produced is sufficient to overcome the springs 4, in direction toward the outside of the curve, whereupon arm 5 moves lever 7 which draws rod 10 and causes movement of throtle 12 to decrease the supply of fuel to the motor so that the speed of the vehicle is diminished. The strength of springs 4 is such that arm 1 swings only if the speed of the vehicle with relation to the radius of the curve aproaches the danger limit for skidding or turning over. When the speed of the vehicle diminishes, arm 1 swings back toward normal position and assumes that position as soon as the speed has decreased a certain amount or the curve has been rounded.

In the second form of the invention illustrated, the differential housing is so arranged that under the influence of centrifugal force, it can move somewhat along the axle shaft. Reference character 23 designates the propeller shaft to which is attached a pinion 24, meshing with a gear 25, forming part of a housing 26 which is rotatably mounted in differential and axle housing 27.

The usual differential gear 28, 29, 30, 31 is arranged within a differential case 32 which is movable in axle direction relatively to housing 26 but rotates therewith, the differential case 32 sliding in the slots indicated in dotted lines in Fig. 1. The shafts 34, together with the rear wheels, the outside walls of the brake drum, and the case 32 may be considered as a unit relatively slidable to the housing 26, 27, axle tube 35, and inner brake drum 43, these latter parts being firmly secured to the chassis.

The differential housing 27 is as usual firmly fixed to the axle housing 35 surrounding the axle shaft, of which each has a projecting portion 36, in which a pin 37 is rotatably mounted, which pin carries a fork-shaped arm 38 (Fig. 6) which rests against a flange 39 on axle shaft 34. Between each flange 39 and a shoulder 40 on the axle housing is a spring 41. These springs 41 serve to normally hold the differential housing 27 and the axle housings 35 in middle position in respect to the rear axles. At each outer end the axle shaft parts are mounted on the axle housings by means of a ball bearing 42, the inner ring of which is axially moveable but not radially with respect to the axle shaft, for example, by means of several axial grooves in the axle shaft, in which corresponding projections on the ball-bearing move in order to permit relative movement of the inner drum 43 to the differential case and axles.

Reference character 43 designates the inner wall of the brake drum 44 which is secured to the wheel. The rotary pins 37 for arms 38 have also secured to them arms 45 outside projections 36 which arms 45 are connected to one end of rods 46. The other end of each rod 46 passes loosely through a nipple 47 which is movably connected by means of arm 48 to an equalizing shaft 49. Each rod 46 is provided with an adjustable collar with rests against nipple 47.

Equalizing shaft 49 is arranged so that by means of an arm 51 and a rod 52 it can adjust the fuel supply in manner similar to that effected by weight 3. For purpose of illustration, rod 52 is shown as controlling a second throttle 12$^a$ similar to throttle 12, which also controls supply of fuel to the engine.

The arrangement now described operates as follows:

When, upon rounding a curve, the centrifugal force operating on the vehicle overcomes the resistance of a spring 41, the rear part of the vehicle frame with the differential housing 27 and the axle tubes 35 moves along the rear axle toward the outside of the curve. One of the arms 38 is thus rotated and this causes rotation of equalizing shaft 49, whereby the fuel supply to the motor is decreased and consequently the speed of the vehicle diminishes.

As soon as the speed has gone down a certain amount, the frame is moved back to middle position by spring 41 and the effect of shaft 49 on the throttle is diminished.

Another form of the invention is shown in the above Fig. 1 and Fig. 7. This form consists in a means for breaking the spark circuit and may be used with or without a throttle control as previously described. A two armed lever 55 is mounted on a pin 56, secured to the vehicle frame in any desired manner. One arm of lever 55 is acted upon by a circular plate 57 eccentrically mounted on shaft 49, which upon rotation of shaft 49 in the direction indicated by the arrow, breaks contact by moving spring 54 away from fixed contact 53. In order to return the contact spring 54 to contact with member 53, there is arranged on shaft 49 an eccentric cam 58 which acts on the other arm of the lever 55.

Lever 55 is provided with a point 59 which co-operates with a roller 60 mounted on a pin 61 on a piston member 62 arranged in a guide 63 and acted on by a spring 64 in direction against arm 55. When shaft 49 is turned in the direction indicated by the arrow, the plate 57 rotates lever 55 into the position shown in dot and dash lines in which position point 59 acts on roller 60 in a line with the centers of pin 61 and pin 56. In this position the spring 54 is still in contact with contact 53.

On a slight further movement of shaft 49 in the direction shown by the arrow, the lever 55 is quickly driven over to the position shown in dotted lines, in which spring 54 is out of contact with contact 53 and the ignition circuit is broken. On account of the break in ignition, the motor acts as a brake on the vehicle, as a result of which the speed is diminished. As soon as the speed has gone down below the danger limit, shaft 49 is turned in the opposite direction to that shown by the arrow and sheave 58 moves lever 55 back to the position shown in full lines. Obviously the weight 3 could be arranged to control the circuit breaker.

In Figs. 1 and 8 is shown an arrangement for disengaging the motor from the rear wheels and also for applying brakes when the speed of the vehicle on a curve approaches a certain limit. On the equalizing shaft 49 is fixed a cam 65 which, upon rotation of the shaft in the direction shown by arrow, operates a two-armed lever 67 rotatable about a pin 66, which, by means of rod 68 is connected to the clutch in such a manner that the clutch is released when the cam 65 rotates lever 67 out of the position shown in full lines.

On the shaft 49 is also fixed an arm 69 which, by means of a rod 70 is connected with the brakes, preferably a brake 91 on the main shaft. Movement of arm 69 to the position shown in dotted lines has no braking effect but when the arm 69 reaches the position indicated by dot and dash lines, the brakes are applied.

The idea of having some part of the vehicle operate on a member which controls the speed of the vehicle, can obviously be carried out in other ways than above described. The movable part of the vehicle may, for example, be the body or some part of the body.

With motorcycles, the side car body can be arranged to be movable along its axle and to control the speed. Since the danger of turning over with vehicles of this sort is greater when the side car is on the inside of the curve than when the motorcycle is on the inside, it is well to arrange the springs by means of which the side-car body is held in middle position in such a manner that the side car can more readily move toward the motorcycle than away from it, so that on rounding a curve with the side car on the inside a greater decrease of fuel supply or a quicker break in the ignition circuit occurs.

It can further be of value to have the springs adjustable to make allowance for load, as when the side car carries or does not carry passengers. This arrangement may also be used with other vehicles to regulate the spring force according to the load in the vehicle.

The safety arrangement shown in detail in Fig. 9 has for its purpose to lock the equalizing shaft 49 when the vehicle is going straight-forward. A collar 71 with a projection 72 is fixed to shaft 49. Projection 72 is adapted to engage a surface 73 on a collar 74, rotatable on shaft 49. Collar 74 is provided with an arm 75 which, by means of a rod 76 is connected with an arm 77 on a shaft 90.

On the steering column 78 there is arranged a worm 79 which meshes with a gear 80 on shaft 90. On driving straight the arms 75 and 77 assume the position indicated by full lines, in which the projection 72 prevents shaft 49 from moving under the influence of rods 46. As soon as the steering wheel is turned in one or the other direction for rounding a curve, collar 74 is rotated so that it no longer prevents shaft 49 from turning. The amount of rotation of collar 74 is preferably somewhat greater than the rotary movement of shaft 49.

Fig. 10 shows another safety arrangement. If the vehicle stops by the side of a road and has so great an inclination to one side that a spring 41 is compressed by movement of the whole vehicle along the rear axle and the motor is disconnected, in order to make starting possible, an arm 81 is fixed to shaft 49 which is connected to a loosely movable rod 82 provided with an adjustable stop 83. A rod 85 is connected to a clutch pedal 84 and rests against an end of a bell crank 86 and at its free end is formed as a fork 87, which in the position shown in full lines surrounds rod 82. Bell crank 86 is connected to the gear shift by means of rod 88 in such a manner that when going in high gear the arrangement is in the position shown in full lines.

Rod 85 is influenced by a spring 89 which tends to draw the same downwardly. If the vehicle stops with the gears in high on an incline such that a spring 41 is compressed, stop 83 moves rod 85 so that pedal 84 is pulled down to about the position shown in full lines in Fig. 10. By further pressing down on the pedal it is possible to shift fork 87 so much that it is no longer in contact with stop 83. On readjustment of the gears to neutral position, the bell crank is moved to the position shown by dotted lines, whereupon rod 85 falls down and fork 87 is away from stop 83 and the motor can be connected on lower gear.

The safety arrangement according to Fig. 10 can be combined with the arrangement shown in Fig. 8 by connected rod 82 with lever 67 instead of rod 68.

With electrically driven vehicles, the lever 7 or shaft 49 can operate a rheostat which is connected to the motor feed line by means of the controller when the same is adjusted for highest speed, and which, upon rotation of lever 7 or shaft 49 increases or decreases the rheostat resistance.

Having thus described my invention, what I claim is:

1. In combination, a motor vehicle, a motor for said vehicle, a fuel supply for said motor and means responsive to the developing of centrifugal force by change of course of said vehicle to control said fuel supply.

2. In combination, a motor vehicle, a motor for said vehicle, a fuel supply for said motor and means responsive to centrifugal force caused by change of course of said vehicle to diminish said fuel supply when the centrifugal force increases to a given value.

3. In combination, a motor vehicle, means to propel said motor vehicle and means responsive to the developing of centrifugal force by change of course of said vehicle to decrease the effect of the propelling means.

4. In a motor vehicle, in combination, a motor, an ignition apparatus for said motor, an ignition circuit for said ignition apparatus, and means responsive to the developing of centrifugal force by change of course of said vehicle to break said ignition circuit.

5. In a motor vehicle, a brake, and means responsive to the developing of centrifugal force by change of course of said vehicle to apply said brake.

6. In a motor vehicle, a differential, an axle shaft, means to permit relative movement of said differential and axle shaft, a motor and means responsive to relative movement of said differential and said axle shaft adapted to influence the speed of said motor.

7. In a motor vehicle, a differential, an axle shaft, means to permit relative movement of said differential and said axle shaft under the influence of centrifugal force, a motor, fuel control means for said motor and means responsive to relative movement of said differential and said axle shaft to control said fuel control means.

8. In a motor vehicle, an axle shaft, a flange on said axle shaft, a member surrounding said shaft, a shoulder on said member, a spring between said flange and said shoulder, an arm rotatable upon relative movement of said flange and said shoulder and speed control means operated by said lever.

9. In a motor vehicle, an axle shaft, a flange on said axle shaft, a member surrounding said shaft, a shoulder on said member, a spring between said flange and said shoulder, an arm rotatable upon relative movement of said flange and said shoulder, an equalizing shaft, an arm on said equalizing shaft, a rod connecting said arms and speed control means operated upon rotation of said equalizing shaft.

10. In a motor vehicle, a differential, an axle shaft, means to permit relative movement of said differential and said axle shaft under the influence of centrifugal force, an equalizing shaft, a member movable upon relative movement of said differential and said axle shaft, connecting means between said member and said equalizing shaft, a steering column, means to lock said equalizing shaft when the steering column is in a given position and means to release the locking means when the steering column is in another position.

11. In a motor vehicle, an arm pivoted about a vertical axis, a weight on said arm, tension means acting on said arm and fuel control means controlled by movement of said arm.

12. In a motor vehicle a throttle, a rotatable shaft to control said throttle, a gear on said shaft, an annular gear, a pinion acting between the first-mentioned gear and said annular gear, means to move said annular gear and means responsive to centrifugal force to move said pinion.

13. In a motor vehicle, a throttle, a rotatable shaft to control said throttle, a gear on said shaft, an annular gear, a pinion acting between the first-mentioned gear and the annular gear, manual means to move said annular gear, an arm pivoted about a vertical axis, a weight on said arm, tension means acting on said arm, a lever controlled by movement of said arm and means to move said pinion upon movement of said arm.

14. Ignition control mechanism for a vehicle comprising a two armed lever, a contact controlled by one arm of said lever, a cam acting on one arm, means to rotate said cam responsive to centrifugal force, and return motion mechanism acting on the other arm.

15. Ignition control mechanism for a vehicle comprising a two-armed lever, a contact controlled by one arm of said lever, means to rotate said lever responsive to centrifugal force, a return cam acting on the other arm and means to rotate the return cam.

16. Ignition control mechanism for a vehicle comprising a spring contact, a stationary contact, cam mechanism to alter the relation of said spring contact to said stationary contact in response to centrifugal force and quick action mechanism to quickly separate said spring contact and said stationary contact upon a given movement of said spring contact by said cam mechanism.

17. In a motor vehicle, a motor, an axle shaft, means to disconnect the motor from the axle shaft responsive to centrifugal force and manual means for permitting connection of the motor to the axle shaft while the disconnecting means is in operation.

18. In combination, a motor vehicle, fuel supply means therefor, brake means therefor, ignition means therefor, and clutch means therefor, and mechanism responsive to centrifugal force caused by change of course of said vehicle to control said fuel supply means, said brake means, said ignition means and said clutch means.

19. In combination, a motor vehicle, fuel supply means therefor, ignition means therefor, and mechanism responsive to centrifugal force caused by change of course of said vehicle to control said fuel supply means and said ignition means.

20. In combination, a motor vehicle, brake means therefor, clutch means therefor, and mechanism responsive to centrifugal force caused by change of course of said vehicle to control said brake means and said clutch means.

In testimony whereof I affix my signature.

GUSTAF EMANUEL JOHANSON.